(12) United States Patent
Alanis

(10) Patent No.: US 8,930,923 B2
(45) Date of Patent: Jan. 6, 2015

(54) GENERATING DEBUGGING EXTENSION SOURCE CODE UTILIZING DEBUGGING INFORMATION

(71) Applicant: International Business Machines Corporation, Armonk, NY (US)

(72) Inventor: Francisco J. Alanis, Cedar Park, TX (US)

(73) Assignee: International Business Machines Corporation, Armonk, NY (US)

(*) Notice: Subject to any disclaimer, the term of this patent is extended or adjusted under 35 U.S.C. 154(b) by 20 days.

(21) Appl. No.: 13/721,193

(22) Filed: Dec. 20, 2012

(65) Prior Publication Data

US 2014/0181786 A1 Jun. 26, 2014

(51) Int. Cl.
*G06F 9/44* (2006.01)
*G06F 11/36* (2006.01)
*G06F 9/45* (2006.01)

(52) U.S. Cl.
CPC .............. *G06F 11/3624* (2013.01); *G06F 8/30* (2013.01); *G06F 8/41* (2013.01)
USPC ....................................................... 717/145

(58) Field of Classification Search
CPC ........ G06F 11/3624; G06F 8/48; G06F 8/443
USPC ........................................................ 717/145
See application file for complete search history.

(56) References Cited

U.S. PATENT DOCUMENTS

| 5,265,254 | A  | * | 11/1993 | Blasciak et al. ............... 717/130 |
| 5,675,803 | A  | * | 10/1997 | Preisler et al. ................ 717/131 |
| 5,889,988 | A  |   | 3/1999  | Held |
| 5,956,479 | A  | * | 9/1999  | McInerney et al. ........ 714/38.13 |
| 6,968,546 | B2 | * | 11/2005 | Lueh .............................. 717/158 |
| 7,467,375 | B2 |   | 12/2008 | Tondreau et al. |
| 7,478,366 | B2 |   | 1/2009  | Bickson et al. |
| 7,788,537 | B1 |   | 8/2010  | Yellen et al. |
| 7,975,260 | B1 |   | 7/2011  | Conover |
| 8,001,266 | B1 |   | 8/2011  | Gonzalez et al. |
| 2005/0273772 | A1 | | 12/2005 | Matsakis et al. |
| 2008/0163088 | A1 | | 7/2008  | Pradhan et al. |
| 2008/0244325 | A1 | | 10/2008 | Tyulenev |
| 2011/0154295 | A1 | | 6/2011  | Aharoni et al. |

* cited by examiner

*Primary Examiner* — Ryan Coyer
(74) *Attorney, Agent, or Firm* — Daniel R. Simek; Ian McKee

(57) ABSTRACT

A computer creates an extended compiled code from original source code and generated debugging extension source code. The computer receives an original source code, compiles the original source code into an original compiled code including debugging information, and generates a debugging extension source code based on the debugging information included in the original compiled code. The computer inserts the debugging extension source code into the original source code to produce an extended source code, and compiles the extended source code into an extended compiled code. The debugging information includes one or more of a debugging symbol, symbolic data, a strings table, a strings list, or a cross reference between the original source code and the original compiled code. The debugging extension source code can be inserted into the original source code in a plurality of locations.

20 Claims, 4 Drawing Sheets

GENERATING DEBUGGING EXTENSION SOURCE CODE UTILIZING DEBUGGING INFORMATION

FIELD OF THE INVENTION

The present invention relates generally to the generation of debugging extensions for debugging, and more particularly to generation of debugging extensions for debugging using debugging information compiled into a program executable.

BACKGROUND

A software system refers to a collection of software components such as user applications, application modules, virtual machines, operating systems, etc. (collectively, "programs") that operate together to perform various tasks. During the execution of the software system, deviations (in terms of functionality, results, performance, throughput, etc.) from a desired or expected behavior of the software system may be observed. Debugging refers to the process of identifying and fixing errors in the programs that cause these deviations in the software system. Many challenges are presented in debugging of software systems during software development.

A programmer can use a program commonly known as a "debugger" to debug another program under development. The debugger can be controlled by reading commands from a debugger script or by receiving debugger instructions directly from the programmer. Debuggers typically support several operations to assist a programmer. A first operation supported by conventional debuggers is an execution control step function which permits a programmer to process program lines, instructions, or statements one at a time to see the results of each program line upon completion. A second operation supported by conventional debuggers is an execution control breakpoint operation which permits a programmer to define a breakpoint as a precise program line, instruction, or statement at which execution of a program can be conditionally or unconditionally halted. A third operation supported by conventional debuggers is a live data manipulation operation which permits a programmer to actively read and write from memory, registers, and other areas of storage to influence program execution. To use a debugger, a programmer will first typically compile the program to be debugged with included debugging information, such as debugging symbols that express which programming-language constructs generated a specific piece of machine code in an executable, resulting in a compiled executable larger than would otherwise be the case. In certain situations where debugging information cannot be compiled into the program under development, utility of a debugger may be limited.

Instead of using a debugger, a programmer can include debugging extensions or plug-ins directly into the program code of the program under development. These debugging extensions can then, after compilation and during execution, export or display data related to program execution for inspection by the programmer. Use of such debugging extensions can avoid the need to compile the program under development with debugging information. However, the use of debugging extensions has its own drawbacks. For example, debugging extensions can be difficult to maintain during initial development, when memory structures in the program under development change frequently. Further, they increase the scope of projects that implement them, insofar as writing debugging extensions can be very time consuming for the programmer. They can become unreliable if there is not a strict process to keep them up-to-date as the program under development evolves. Finally, they can make debugging a program under development very difficult if there is a debugging extension error that compounds a "real" defect in the program under development being debugged with the erroneous debugging extension.

Thus, although both debuggers and debugging extensions help programmers understand errors in programs under development, each conventional technique includes its own drawbacks.

SUMMARY

Embodiments of the present invention provide for a program product, system, and method in which a computer creates an extended compiled code from original source code and generated debugging extension source code. The computer receives an original source code, compiles the original source code into an original compiled code including debugging information, and generates a debugging extension source code based on the debugging information included in the original compiled code. The computer inserts the debugging extension source code into the original source code to produce an extended source code, and compiles the extended source code into an extended compiled code. The debugging information includes one or more of a debugging symbol, symbolic data, a strings table, a strings list, or a cross reference between the original source code and the original compiled code. The debugging extension source code can be inserted into the original source code in a plurality of locations.

DETAILED DESCRIPTION

Figure 1:
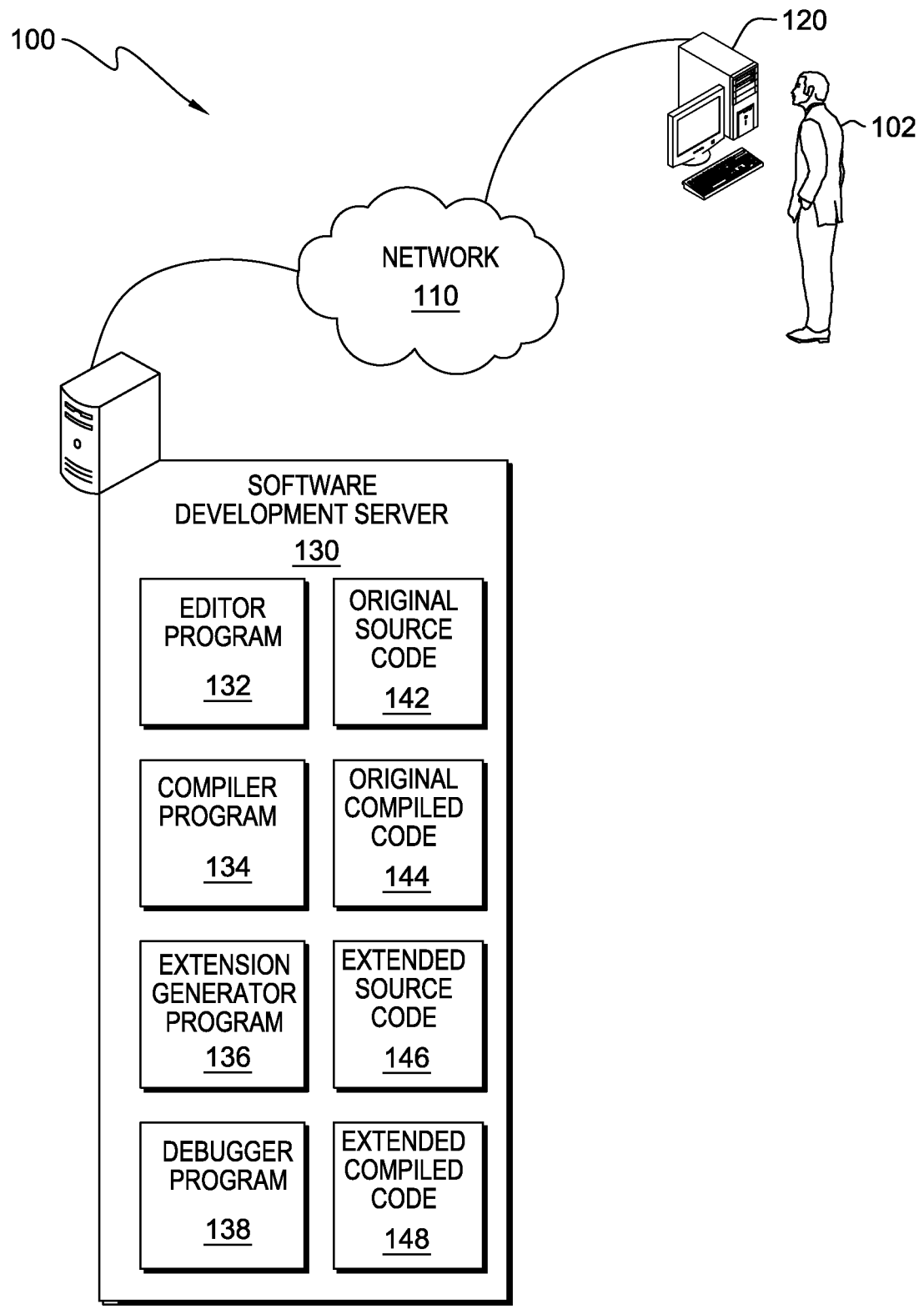
FIG. 1 is a functional block diagram of a software development environment in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a functional block diagram of software development environment 100 in accordance with an embodiment of the present invention is shown. Software development environment 100 includes network 110, programming device 120, and software development server 130. Network 110 can be, for example, a local area network (LAN), a wide area network (WAN) such as the Internet, or a combination of the two, and can include wired or wireless connections. In general, network 110 can be any combination of connections and protocols that will support communications via various channels between programming device 120 and software development server 130 in accordance with an embodiment of the invention. As will be discussed in detail below, person 102, a programmer, can utilize programming device 120 to develop and debug a program under development in software development environment 100.

In various embodiments, each one of programming device 120 and software development server 130 can include a laptop, tablet, or netbook personal computer (PC), a desktop computer, a personal digital assistant (PDA), a smart phone, a mainframe computer, or a networked server computer. Further, software development server 130 can include computing systems utilizing clustered computers and components to act as single pools of seamless resources when accessed through network 110, or can represent one or more cloud computing datacenters. In general, each one of programming device 120 and software development server 130 can be any programmable electronic device as described in further detail with respect to FIG. 4. In one embodiment, the current technique can be implemented entirely in one device, such as in programming device 120.

Programming device 120 includes a client program (not shown) for interacting with software development server 130 via network 110. Person 102 uses the client program to issue commands to software development server 130 to edit, compile, and debug original source code 142, which is a version of the source code of the program under development. In particular, the client program can interact with editor program 132, which person 102 uses to edit original source code 142. For example, in one embodiment the client program and editor program 132 can be included in an integrated development environment (i.e., an IDE). Further, the client program can interact with compiler program 134, to instruct compiler program 134 to compile original source code 142 into, for example, original compiled code 144. Compiler program 134 can be configured to produce compiled code that either does or does not include debugging information. Further still, the client program can interact with extension generator program 136, which operates in concert with compiler program 134 to produce extended source code 146 and extended compiled code 148 in accordance with embodiments of the present invention, as discussed in greater detail below. Finally, the client program can interact with debugger program 138, which person 102 can optionally use to debug compiled code that has been compiled with debugging information.

Debugging information included in original compiled code 144 by compiler program 134 can include several different kinds of information. For example, debugging information can include debugging symbols expressing which programming-language constructs generated a specific piece of machine code in an executable, such as original compiled code 144. Debugging information can also include symbolic data for translating variable names in original source code 142 to addresses in original compiled code 144 and for providing details of functions in original source code 142. Debugging information can also include a strings table mapping symbol to variable contents and other metadata, and can also include a strings list of string constants. Debugging information can further include a cross reference between line numbers in original source code 142 and addresses in original compiled code 144. Further still, debugging information can also include the number of lines of executable code in original source code 142, or the names of all of the individual source code files that together comprise original source code 142, or other information about original source code 142, whether or not derived from programming-language constructs expressed in original source code 142.

Software development server 130 can communicate with programming device 120 via a client program of programming device 120, as discussed above. Software development server 130 includes editor program 132, compiler program 134, extension generator program 136, and debugger program 138 which person 102 utilizes to edit, compile, and debug original source code 142 in accordance with embodiments of the present invention. Software development server 130 includes original source code 142 and extended source code 146, which are different versions of the source code of the program under development. In particular, extended source code 146 includes the contents of original source code 142, as well as debugging extensions (i.e., debugging extension source code) generated by extension generator program 136, as will be discussed in detail below. Further, software development server 130 includes original compiled code 144 and extended compiled code 148, which are different versions of the compiled code of the program under development. In particular, extended compiled code 148 has been compiled from original source code 142, as well as from the debugging extensions generated by extension generator program 136. Person 102 can utilize extended compiled code 148 to debug the program under development, with or without using debugger program 138, according to embodiments of the present invention, as discussed in detail below.

Figure 2A:
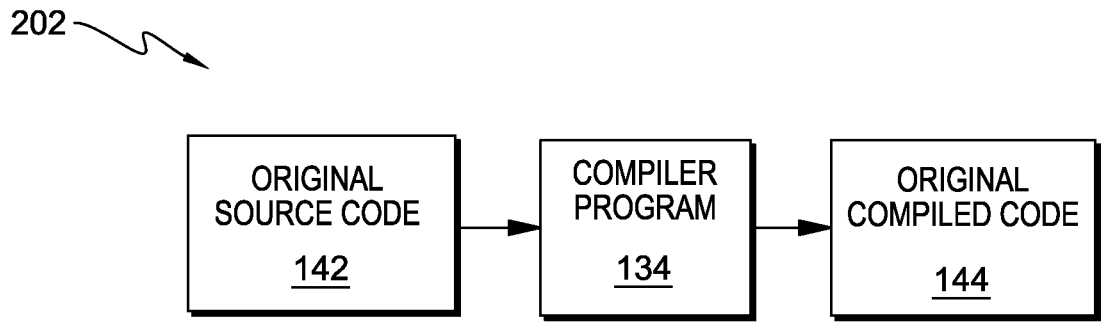
FIGS. 2A, 2B, and 2C are functional block diagrams of software development workflows in accordance with an embodiment of the present invention.
Figure 2B:
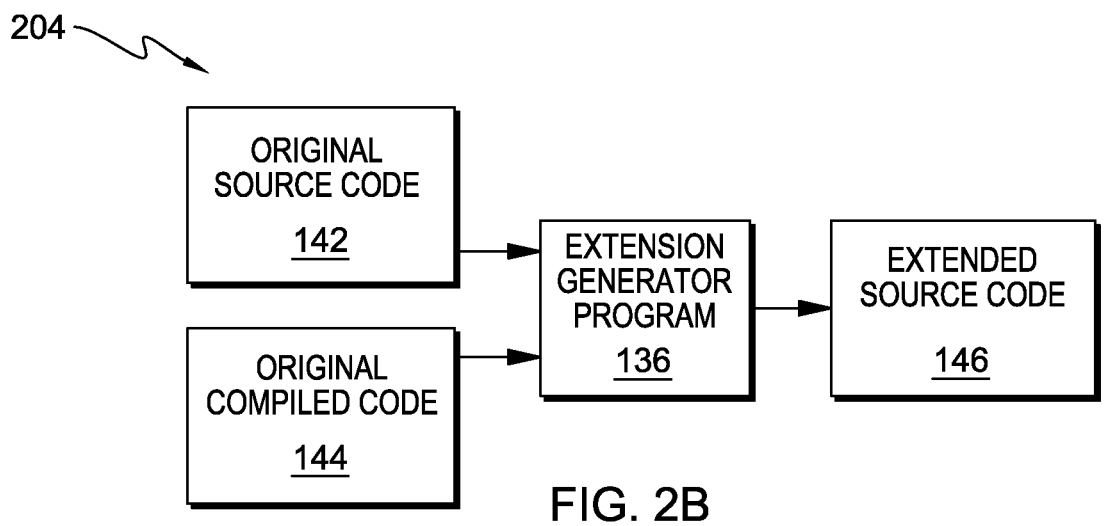
Figure 2C:
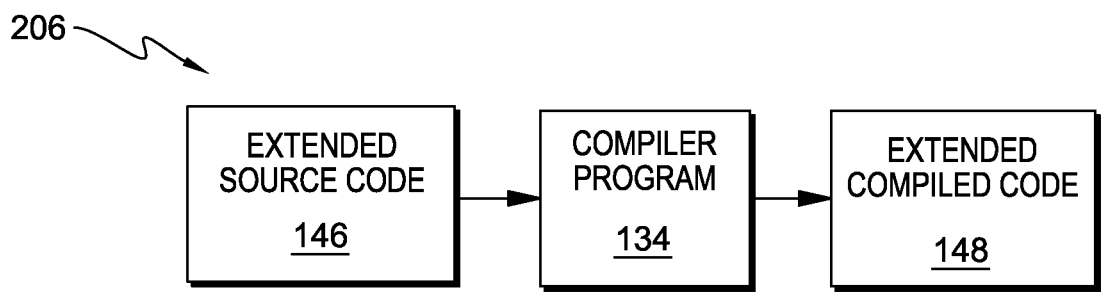

FIGS. 2A, 2B, and 2C show functional block diagrams of software development workflows 202, 204, and 206 in accordance with an embodiment of the present invention. In one embodiment, prior to the beginning of workflows 202, 204, and 206, editor program 132 is used to produce original source code 142. For example, original source code 142 can be produced as person 102 enters program lines, instructions, or statements into the client program of programming device 120, in communication with editor program 132 over network 110. In particular, program lines, instructions, or statements can include code written in a programming language such as C, Java, or Lisp, for example. Person 102 can invoke workflows 202, 204, and 206 upon the completion of an editing task, for example. In another embodiment, workflows 202, 204, and 206 can be invoked automatically under the control of another program. Although during the discussion below it will be explained that debugging information is compiled into original compiled code 144 during workflow 202, the use of debugger program 138 is not necessary to debug the program under development. As such, workflows 202, 204, and 206 do not depict the use of debugger program 138.

Turning now to FIG. 2A, workflow 202 depicts the utilization of compiler program 134 in the creation of original compiled code 144 using original source code 142 as its input. In one embodiment, original compiled code 144 includes machine language instructions suitable for execution on a microprocessor, while in another embodiment, original compiled code 144 includes bytecode suitable for execution on a virtual machine (e.g., on a Java virtual machine, etc.). During compilation, compiler program 134 includes debugging information in original compiled code 144, such as debugging symbols expressing which programming-language constructs in original source code 142 generated a specific piece of machine code or bytecode in original compiled code 144. As such, original compiled code 144 is suitable for use with debugger program 138. However, debugger program 138 will not be used during the following workflows 204 and 206, and instead another debugging technique will be used, in accordance with an embodiment of the present invention.

Turning now to FIG. 2B, workflow 204 depicts the utilization of extension generator program 136 in the creation of extended source code 146, using original source code 142 and original compiled code 144 as inputs. In one embodiment, workflow 204 begins after the completion of workflow 202, although in another embodiment workflows 202 and 204 can operate at least partially in parallel. Extension generator program 136 creates extended source code 146 by generating debugging extensions (i.e., debugging extension source code), based on the debugging information compiled into original compiled code 144, and inserting the debugging extensions into original source code 142. Each generated debugging extension can be a program line, instruction, or statement written in a programming language such as C, Java, or Lisp, for example.

For example, original compiled code 144 may include one or more debugging symbols designed to assist debugger program 138 in exporting or displaying a data structure of original source code 142 to person 102 during a debugging session with debugger program 138 (a data structure is one type of programming-language construct extant in original source code 142). Extension generator program 136 can locate the one or more debugging symbols in original compiled code 144 and generate a debugging extension that exports or displays the data structure (or one or more other programming-language constructs) during subsequent execution of a program compiled from extended source code 146, without the assistance of debugging program 138. Further, extension generator program 136 can locate and utilize any kind of debugging information within original compiled code 144, such as symbolic data, a strings table, a strings list, a cross reference between line numbers in original source code 142 and addresses in original compiled code 144, the number of lines of executable code in original source code 142, or the names of all of the individual source code files that together comprise original source code 142, or other information about original source code 142, whether or not derived from programming-language constructs expressed in original source code 142. Extension generator program 136 can insert the generated debugging extension into original source code 142 in the process of creating extended source code 146. The debugging extension can be inserted at one or more locations of original source code 142, to facilitate export or display of the data structure at appropriate points of execution. Extension generator program 136 can determine appropriate points of execution with reference to the debugging information in original compiled code 144, for example.

Turning now to FIG. 2C, workflow 206 depicts the utilization of compiler program 134 in the creation of extended compiled code 148 using extended source code 146 as its input. In one embodiment, workflow 206 begins after the completion of workflow 204, although in another embodiment workflows 204 and 206 can operate at least partially in parallel. In one embodiment, extended compiled code 148 includes machine language instructions suitable for execution on a microprocessor, while in another embodiment, extended compiled code 148 includes bytecode suitable for execution on a virtual machine (e.g., on a Java virtual machine, etc.). During compilation, compiler program 134 does not include debugging symbols or other debugging information in extended compiled code 148.

After workflows 202, 204, and 206 have completed, extended compiled code 148 has been produced. Person 102 can then invoke the execution of extended compiled code 148 to debug it without the use of debugger program 138. Because extended compiled code 148 has been compiled from extended source code 146, which includes the generated debugging extensions (i.e., debugging extension source code), during its subsequent execution the export or display of data structures and other programming-language constructs at appropriate points of execution is facilitated. For example, the data structures and other programming-language constructs can be displayed in real-time for quick examination by person 102, or can be exported to a log file for later thorough examination by person 102.

Figure 3:
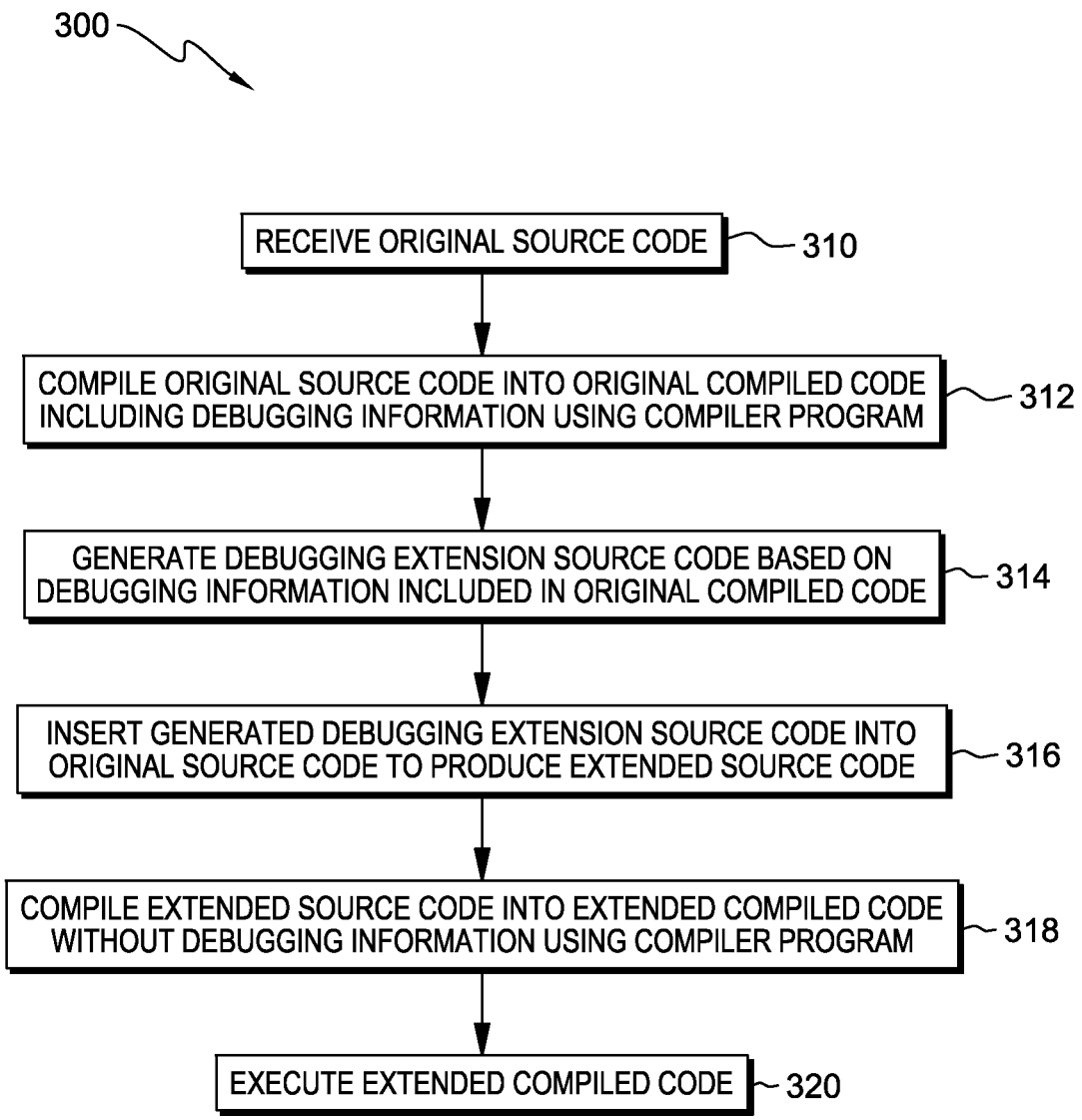
FIG. 3 is a flowchart depicting steps followed by an editor program, a compiler program, and an extension generator program during software development in accordance with an embodiment of the present invention.

FIG. 3 shows flowchart 300 depicting steps followed by editor program 132, compiler program 134, and extension generator program 136 of software development server 130 during software development in accordance with an embodiment of the present invention. In step 310, original source code is received. For example, original source code 142 can be received by editor program 132, as person 102 interacts with it via the client program of programming device 120. In step 312, original source code is compiled into original compiled code including debugging information using a compiler program. For example, compiler program 134 can compile original source code 142 into original compiled code 144 (e.g., as depicted in workflow 202 of FIG. 2A). In step 314, debugging extensions (i.e., debugging extension source code) are generated based on debugging information included in the original compiled code. For example, extension generator program 136 can generate debugging extensions based on debugging information included in original compiled code 144 (e.g., as depicted in workflow 204 of FIG. 2B). In step 316, the generated debugging extensions are inserted into the original source code to produce extended source code. For example, extension generator program 136 can insert the generated debugging extensions into original source code 142 to produce extended source code 146 (e.g., as further depicted in workflow 204 of FIG. 2B). In step 318, the extended source code is compiled into extended compiled code without debugging information using the compiler program. For example, compiler program 134 can compile extended source code 146 into extended compiled code 148 (e.g., as depicted in workflow 206 of FIG. 2C). In step 320, the extended compiled code is executed. For example, person 102 can invoke the execution of extended compiled code 148 to debug it without the use of debugger program 138.

Figure 4:
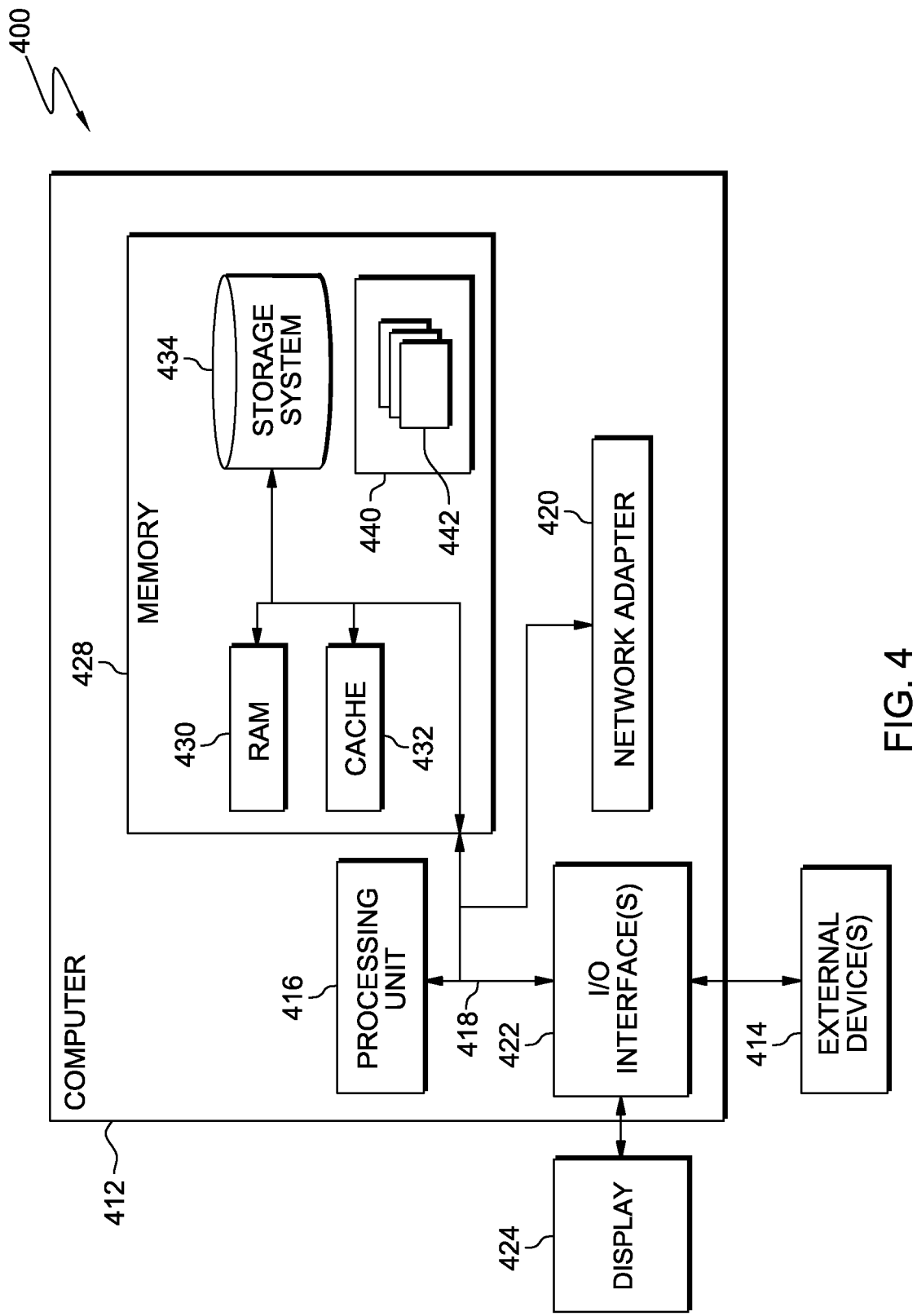
FIG. 4 is a functional block diagram of a computer system in accordance with an embodiment of the present invention.

Referring now to FIG. 4, a functional block diagram of a computer system in accordance with an embodiment of the present invention is shown. Computer system 400 is only one example of a suitable computer system and is not intended to suggest any limitation as to the scope of use or functionality of embodiments of the invention described herein. Regardless, computer system 400 is capable of being implemented and/or performing any of the functionality set forth hereinabove.

In computer system 400 there is computer 412, which is operational with numerous other general purpose or special purpose computing system environments or configurations. Examples of well-known computing systems, environments, and/or configurations that may be suitable for use with computer 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Each one of programming device 120 and software development server 130 can include or can be implemented as an instance of computer 412.

Computer 412 may be described in the general context of computer system executable instructions, such as program modules, being executed by a computer system. Generally, program modules may include routines, programs, objects, components, logic, data structures, and so on that perform particular tasks or implement particular abstract data types. Computer 412 may be practiced in distributed cloud computing environments where tasks are performed by remote processing devices that are linked through a communications network. In a distributed cloud computing environment, program modules may be located in both local and remote computer system storage media including memory storage devices.

As further shown in FIG. 4, computer 412 in computer system 400 is shown in the form of a general-purpose computing device. The components of computer 412 may include, but are not limited to, one or more processors or processing units 416, memory 428, and bus 418 that couples various system components including memory 428 to processing unit 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 412 typically includes a variety of computer system readable media. Such media may be any available media that is accessible by computer 412, and includes both volatile and non-volatile media, and removable and non-removable media.

Memory 428 can include computer system readable media in the form of volatile memory, such as random access memory (RAM) 430 and/or cache 432. Computer 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program 440, having one or more program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein. Editor program 132, compiler program 134, extension generator program 136, debugger program 138, and the client program of programming device 120 can be implemented as or can be an instance of program 440.

Computer 412 may also communicate with one or more external devices 414 such as a keyboard, a pointing device, etc., as well as display 424; one or more devices that enable a user to interact with computer 412; and/or any devices (e.g., network card, modem, etc.) that enable computer 412 to communicate with one or more other computing devices. Such communication can occur via Input/Output (I/O) interfaces 422. Still yet, computer 412 can communicate with one or more networks such as a local area network (LAN), a general wide area network (WAN), and/or a public network (e.g., the Internet) via network adapter 420. As depicted, network adapter 420 communicates with the other components of computer 412 via bus 418. It should be understood that although not shown, other hardware and/or software components could be used in conjunction with computer 412. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method comprising the steps of:
   receiving an original source code;
   compiling the original source code into an original compiled code including debugging information;
   generating a debugging extension source code based on the debugging information included in the original compiled code;
   inserting the debugging extension source code into the original source code to produce an extended source code, wherein the generated debugging extension source code facilitates export or display of at least one programming-language construct associated with the debugging information included in the original compiled code at one or more corresponding execution points in the extended source code; and
   compiling the extended source code into an extended compiled code, wherein execution of the extended compiled code debugs the extended compiled code without use of an additional debugging program.

2. The method of claim 1, wherein the extended compiled code does not include debugging information.

3. The method of claim 1, wherein the debugging information includes one or more of a strings table, a strings list, or a cross reference between the original source code and the original compiled code.

4. The method of claim 1, wherein the debugging information is designed to assist a debugger program.

5. The method of claim 1, wherein the inserting the debugging extension source code into the original source code to produce an extended source code comprises:
   inserting the generated debugging extension source code into the original source code in a plurality of locations in the original source code that facilitate export or display of at least one programming-language construct associated with the debugging information.

6. A computer program product comprising:
   one or more computer-readable hardware storage devices and program instructions stored on at least one of the one or more hardware storage devices, the program instructions comprising:
   program instructions to receive an original source code;
   program instructions to compile the original source code into an original compiled code including debugging information;
   program instructions to generate a debugging extension source code based on the debugging information included in the original compiled code;
   program instructions to insert the debugging extension source code into the original source code to produce an extended source code, wherein the generated debugging extension source code facilitates export or display of at least one programming-language construct associated with the debugging information included in the original compiled code at one or more corresponding execution points in the extended source code; and
   program instructions to compile the extended source code into an extended compiled code, wherein execution of the extended compiled code debugs the extended compiled code without use of an additional debugging program.

7. The computer program product of claim 6, wherein the extended compiled code does not include debugging information.

8. The computer program product of claim 6, wherein the debugging information includes one or more of a strings table, a strings list, or a cross reference between the original source code and the original compiled code.

9. The computer program product of claim 6, wherein the debugging information is designed to assist a debugger program.

10. The computer program product of claim 6, wherein the program instructions to insert the debugging extension source code into the original source code to produce an extended source code comprises program instructions to:

inserting the debugging extension source code into the original source code in a plurality of locations in the original source code that facilitate export or display of at least one programming-language construct associated with the debugging information.

11. A system comprising:
one or more processors, one or more computer-readable memories, one or more computer-readable tangible storage devices, and program instructions stored on at least one of the one or more storage devices for execution by at least one of the one or more processors via at least one of the one or more memories, the program instructions comprising:
program instructions to receive an original source code;
program instructions to compile the original source code into an original compiled code including debugging information;
program instructions to generate a debugging extension source code based on the debugging information included in the original compiled code;
program instructions to insert the debugging extension source code into the original source code to produce an extended source code, wherein the generated debugging extension source code facilitates export or display of at least one programming-language construct associated with the debugging information included in the original compiled code at one or more corresponding execution points in the extended source code; and
program instructions to compile the extended source code into an extended compiled code, wherein execution of the extended compiled code debugs the extended compiled code without use of an additional debugging program.

12. The system of claim 11, wherein the extended compiled code does not include debugging information.

13. The system of claim 11, wherein the debugging information includes one or more of a strings table, a strings list, or a cross reference between the original source code and the original compiled code.

14. The system of claim 11, wherein the debugging information is designed to assist a debugger program.

15. The computer system of claim 11, wherein the program instructions to insert the debugging extension source code into the original source code to produce an extended source code comprises program instructions to:
inserting the debugging extension source code into the original source code in a plurality of locations in the original source code that facilitate export or display of at least one programming-language construct associated with the debugging information.

16. The method of claim 1, wherein execution of the extended compiled code provides one or more of: a real-time display of at least one programming-language construct associated with the debugging information included in the original compiled code, and exporting at least one programming-language construct associated with the debugging information included in the original compiled code to a log file.

17. The computer program product of claim 6, wherein execution of the extended compiled code provides one or more of: a real-time display of at least one programming-language construct associated with the debugging information included in the original compiled code, and exporting at least one programming-language construct associated with the debugging information included in the original compiled code to a log file.

18. The computer system of claim 11, wherein execution of the extended compiled code provides one or more of: a real-time display of at least one programming-language construct associated with the debugging information included in the original compiled code, and exporting at least one programming-language construct associated with the debugging information included in the original compiled code to a log file.

19. The method of claim 16, wherein the programming-language construct includes a data structure.

20. The computer program product of claim 17, wherein the programming-language construct includes a data structure.

* * * * *